United States Patent [19]

Mennicke et al.

[11] 4,388,381
[45] Jun. 14, 1983

[54] ELECTROCHEMICAL STORAGE CELL

[75] Inventors: Stefan Mennicke, Leimen-Gauangelloch; Gert Weddigen, Heidelberg-Handschuhsheim, both of Fed. Rep. of Germany

[73] Assignee: Brown, Boveri & Cie AG, Mannheim, Fed. Rep. of Germany

[21] Appl. No.: 286,452

[22] Filed: Jul. 24, 1981

[30] Foreign Application Priority Data

Jul. 30, 1980 [DE]  Fed. Rep. of Germany ....... 3028836

[51] Int. Cl.³ .......................................... H01M 10/39
[52] U.S. Cl. .................................... 429/104; 429/191
[58] Field of Search ................................ 429/104, 191

[56] References Cited

U.S. PATENT DOCUMENTS 3,748,178   7/1973   Fally et al. ........................ 429/104

FOREIGN PATENT DOCUMENTS 47-25776   7/1972   Japan ................................... 429/104
47-25777   7/1972   Japan ................................... 429/104

*Primary Examiner*—Donald L. Walton
*Attorney, Agent, or Firm*—Herbert L. Lerner; Laurence A. Greenberg

[57] ABSTRACT

Electrochemical storage cell or battery of the alkali metal and chalcogen type with at least one anode space intended for receiving the anolyte and a cathode space for receiving the catholyte. The spaces are separated from each other by an alkali-ion-conducting solid electrolyte wall, and sulfur or sulfides are filled into the cathode space. The cathode space is filled with two or more porous layers of which always at least one is ion-conducting and one is electron-conducting. At least one ion-conducting layer rests at least in regions against the solid electrolyte, and at least one electron-conducting layer rests at least in some areas against the metallic housing of the storage cell. An electron-conducting layer is adjacent to each ion-conducting layer and vice versa. At least the electron-conducting layer is impregnated with sulfur.

13 Claims, 4 Drawing Figures

ELECTROCHEMICAL STORAGE CELL

BACKGROUND OF THE INVENTION

1. Field of the Invention

The invention relates to an electrochemical storage cell or battery of the alkali metal and chalcogen type with at least one anode space to contain an alkali metal as the anolyte and a cathode space intended for receiving the catholyte, which are separated from each other by an alkali-ion-conducting solid electrolyte wall, and that sulfur or sulfides are filled into the cathode space.

2. Description of the Prior Art

Such rechargeable electrochemical storage cells with a solid electrolyte are highly suited for the construction of storage batteries of higher energy and power density. The electrolyte of beta aluminum oxide, used for instance, in sodium/sulfur storage cells, passes only sodium ions. In contrast to the lead storage cell, this means that practically no discharge and no secondary reactions occur during this charge, such as, for instance, water dissociation in the lead-lead-oxide system. The current yield, i.e. the Faraday efficiency of a sodium/sulfur storage cell is near 100%.

However, it is an important disadvantage in such a storage cell that, with large currents, it can be only partially recharged. In the case of Na/S storage cells, this disadvantage is connected with the fact that sulfur (with small percentages of dissolved $Na_2S_5$) and $Na_2S_5$ (with percentages of dissolved sulfur) form two immiscible liquids at the operating temperature of such a storage cell, which is 300° to 350° C. For, if a discharged sodium/sulfur storage cell, which contains $Na_2S_3$ in the cathode space is recharged again, sulfides containing more sulfur are first formed until $Na_2S_5$ has been produced in the cathode space or at least locally. Upon further recharging, liquid sulfur is then formed at points with very active electrochemical reaction. This liquid sulfur being an insulator, blocks the electrochemical processes at that point. In order to avoid this disadvantage, a carbon or graphite felt is filled into the cathode space in addition to the sulfur, as is known from German Published Non-Prosecuted Application No. 2 754 454. This felt is provided with a porous layer of an alkali-ion-conducting substance which leaves the surface of its fibers free in the manner of islands.

While improved rechargeability of the storage cell is achieved with these measures, the desired values are not yet achieved thereby.

SUMMARY OF THE INVENTION

It is, therefore, an object of the invention to provide a storage cell in which blocking of the electrode by locally formed sulfur is avoided while the low internal resistance is retained and thereby, optimum rechargeability is made possible.

With the foregoing and other objects in view, there is provided in accordance with the invention, an electrochemical storage cell or battery based on alkali metal and chalcogen with at least one anode space for the alkali metal anolyte and a cathode space for the chalcogen catholyte of sulfur or sulfides and mixtures thereof with the anode space and the cathode space separated from each other by an alkali-ion-conducting solid electrolyte wall, the combination therewith wherein the cathode space is filled with two or more porous layers of which always at least one is ion-conducting and one is electron-conducting; wherein at least one said ion-conducting layer rests at least in regions against said solid electrolyte wall, and at least one said electron-conducting layer rests at least in some areas against a metallic housing of the storage cell, and wherein an electron-conducting layer is adjacent to each ion-conducting layer and, conversely, an ion-conducting layer is adjacent to each electron-conducting layer; and wherein at least the electron-conducting layer is impregnated with sulfur.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
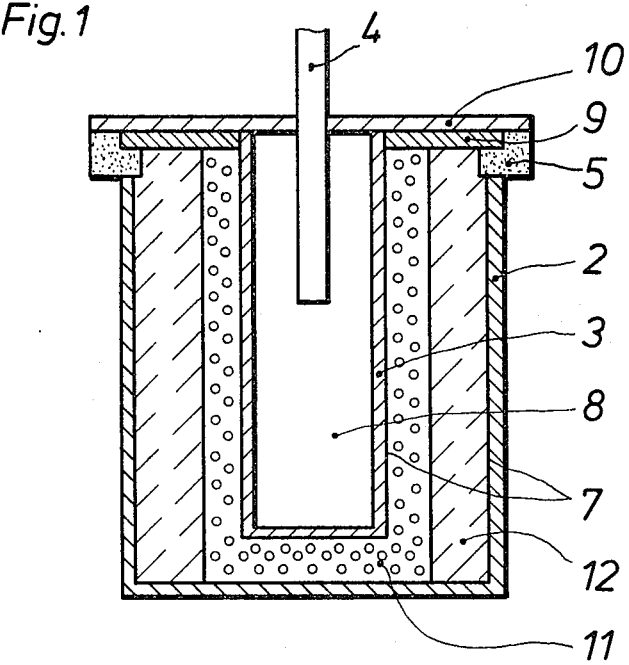
FIG. 1 shows an electrochemical storage cell of the alkali metal and chalcogen type with an ion-conducting and an electron-conducting layer in the cathode space.

In the electrochemical storage cell of the type mentioned at the outset, the cathode space is filled out with two or more porous layers, of which one always is ion-conducting and the other is electron-conducting. At least one said ion-conducting layer makes contact, at least in some regions, with the solid electrolyte, and at least one said electron-conducting layer makes contact at least in some regions with the metallic housing wall of the storage cell, and at least the electron-conducting layer is impregnated with sulfur.

If the cathode space is filled with several ion- and electron-conducting layers, these are inserted therein alternatingly.

In one embodiment of the invention, a first ion-conducting layer is arranged within the cathode space in such a manner that is surrounds the solid electrolyte like an enclosure and rests firmly against it. The electron-conducting layer which is also arranged in the cathode space, is positioned in such manner that it covers the entire inside boundary surface of the metal housing and rests firmly against the latter.

In one embodiment of the invention, the ion-conducting layer is formed by a mat of beta aluminum oxide. It is also possible to make the ion-conducting layer of nasicon. Nasicon is a ceramic material, specifically a mixed crystal consisting of sodium, silicon, phosphorous and oxygen, with the chemical formula; $Na_{1+x}Zr$ $Si_xP_{3-x}O_{10}$. Nasicon is an acronym for Na-super ion conductor.

In an other embodiment of the invention, the ion-conducting layer is made of sodium-yttrium-silicate. The ion-conducting layers placed in the cathode spce can also be made of sodium-intercalated chalcogenides of metals of the group IVb, Vb, VIb of the periodic system of the elements.

The electron-conducting layer or layers inserted into the cathode space, consist preferably of a carbon or graphite felt. Carbon foam can also be used as an electron-conducting layer. Expanded graphite is also highly suitable as the electron-conducting layer. In order to obtain a gradual transition between each ion-conducting and each electron-conducting layer, the graphite felt is arranged in the cathode space in such a manner that its fibers go through adjacent ion-conducting layer at least in some areas. The ion-conducting layer which is in direct contact with the solid electrolyte, can be formed by applying a porous ion-conducting coating on the external surfaces of the solid electrolyte.

If several ion-conducting and several electron-conducting layers are used for filling the cathode space, the ion-conducting layer which is to be arranged between two electron-conducting layers, may be applied on the surface of one of the two confining electron-conducting layers.

With the storage cell according to the invention, the occurrence of local overvoltages which reach maximum values especially in the proximity of the solid electrolytes is prevented by the measures mentioned above.

The storage cell according to the invention is designed so that through a gradual transition from the electron- to the ion-conducting layer, the conversion of the electron current into an ion current takes place in a wide region in the vicinity of the ceramic. The gradual transition between the electron-conducting and the ion-conducting layer is additionally obtained, as already mentioned above, by the provision that the fibers of the carbon or graphite felt go through the ion-conducting layer in certain areas. This facilitates the removal of the sulfur formed toward the end of the charge. Even if, in spite of this, a sulfur layer is formed which encloses the electrolyte ceramic concentrically, the charging process does not cease because the ion-conducting material still keeps diffusion paths for the sodium ions open.

The invention will be explained with reference to the drawings, and the advance obtainable with the invention in the following.

FIG. 1 shows the storage cell according to the invention with a cup-shaped body 2 of metal, a solid electrolyte 3, and a current collector 4. The cup-shaped body 2 of metal is a tube which is closed at one end and is made of thin-walled aluminum or V4A steel. Other metals can, of course, also be used for making the cup-shaped body. In selecting the material, it is merely necessary to pay attention that it is corrosion resistant to sulfur or sulfides and alkali metals. At its upper end, the cup-shaped body 2 is provided with a flange 5 which points in certain areas inward as well as outward. This flange is provided with vertical holes (not shown here) for screws. Inside the cup-shaped body 2, the likewise cup-shaped solid electrolyte 3 is arranged. This is a tube, closed on one side, of beta aluminum oxide. The dimensions of the solid electrolyte 3 are chosen so that between its outer boundary surfaces and the inner boundary surfaces of the cup-shaped body 2, a minimum spacing of several millimeters is maintained everywhere and thereby, a coherent space 7 is formed which serves as a cathode space. The interior of the solid electrolyte 3 assumes the function of the anode space 8, into which the alkali metal, particularly the sodium, is filled. The amount of sodium filled into the solid electrolyte 3 is chosen so large that all inside boundary surfaces of the solid electrolyte 3 are wetted by the sodium. The current collector 4 which protrudes beyond the storage cell on the outside by several millimeters extends into the interior of the solid electrolyte 3. The solid electrolyte 3 is provided at its upper end with an outward-pointing flange 9 which is placed on the flange 5 of the cup-shaped body 2. The flange 9 closes off the cathode space 7 from the outside. The opening of the solid electrolyte 3 is closed by a plate 10 which is made of non-conducting corrosion-resistant material. The plate 10 rests on the upward-pointing edge of the flange 5. The current collector 4, extending into the solid electrolyte 3, goes through this plate and is held thereon.

As FIG. 1 shows, a porous ion-conducting layer 11 and a porous electron-conducting layer 12 are arranged in the interior of the cathode space 7. The ion-conducting layer 11 rests directly against the solid electrolyte 3 and encloses its entire outside surface. In the embodiment of the storage cell shown in FIG. 1, the ion-conducting layer 11 is formed by a mat of beta aluminum oxide. To produce these mats, the commercially available alpha aluminum oxide mats are used which are converted by annealing at 1250° C. in a $Na_2O$-atmosphere. Directly adjacent to the ion-conducting layer 11 is the electron-conducting layer 12 which consists of a carbon or graphite felt. The layer 12 covers the entire inside surface of the housing and rests firmly against the latter. The thickness of the carbon or graphite felt is chosen so that it completely fills the space between the beta aluminum oxide mat and the inside housing wall of the cup-shaped body 2. The thickness of the ion-conducting layer 11 is chosen so that it has at most one-third the thickness of the electron-conducting layer 12. The thickness of the two layers 11 and 12, however, is always chosen large enough so that the ion-conducting layer 11 always rests firmly against the solid electrolyte 3 and borders on the electron-conducting layer 12 without interspace.

In the storage cell shown in FIG. 1, the ion-conducting layer 11 can also be formed by nasicon or sodium-yttrium silicate. The ion-conducting layer 11, if made of these materials, can be made as thick as described above. Also in this embodiment it rests against the solid electrolyte 3 and the electron-conducting layer 12.

In the storage cell according to the invention shown in FIG. 1, the ion-conducting layer can also be formed of sodium-intercalated chalcogenides of the metals from groups IVb, Vb, and VIb of the periodic system. If these materials are used as the ion-conducting layer, the storage cell is designed also as shown in FIG. 1, and is explained in the corresponding description. Preferably, the carbon or graphite felt is embedded in the cathode space, if nacison, sodium-yttrium silicate or sodium-intercalated chalcogenides are used, in such manner that its fibers go through the ion-conducting layer 11 in certain regions.

In all embodiment variants of the storage cell, as described above, the reactant, especially sulfur, is filled into the cathode space in addition to the two layers 11 and 12. This may be accomplished by impregnating the carbon or graphite felt with liquid sulfur. Instead of a graphite felt as the electron-conducting layer, a carbon-foam matrix can be inserted into the cathode space. Likewise, expanded graphite can be used for this purpose which is obtained, for instance, by stretching natural graphite in the direction of the c-axis. If expanded graphite is used as the electron-conducting layer, a hollow cylinder is pressed from a mixture of sulfur and expanded graphite and inserted into the cathode space. The thickness of this hollow cylinder corresponds to the thickness of the layer 12 indicated in FIG. 1. The thickness of the ion-conducting layer 11 is made so that it is adjacent to the solid electrolyte 3 and the hollow cylinder of expanded graphite. If expanded graphite is used, all of the materials given above can be used as material for the ion-conducting layer 11.

Figure 2:
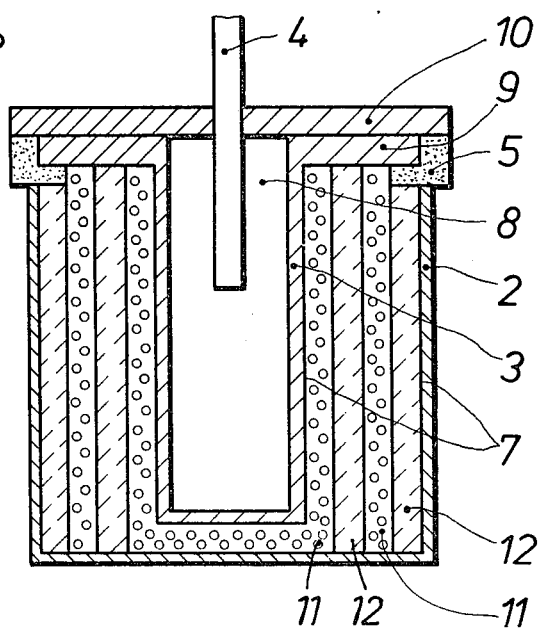
FIG. 2 shows an electrochemical storage cell of the alkali metal and chalcogen type with several ion-conducting and electron-conducting layers in the cathode space.

FIG. 2, likewise, shows an electrochemical storage cell which essentially corresponds to the design of the storage cell which is shown in FIG. 1 and explained in the corresponding description. This storage cell also comprises a cup-shaped body 2 of corrosion-resistant metal. A cup-shaped solid electrolyte 3 is arranged in the interior of the cup-shaped body 2. The dimensions of the solid electrolyte 3 are made here so that between it and the inside housing walls of the body 2, a space is formed which serves as the cathode space 7.

The interior of the solid electrolyte 3 serves as the anode space 8 and is filled with sodium. The current collector 4 extends into the interior of the anode space 8 and protrudes beyond the cover of the storage cell by at least several millimeters. The metallic cup-shaped body 2 serves as the cathodic current collector.

Two porous electron-conducting layers 12 are arranged within the cathode space 7. In the embodiment shown in FIG. 2, the ion-conducting and electron-conducting layers 11 and 12 are arranged alternatingly. The solid electrolyte 3 is completely surrounded by an ion-conducting layer 11. The latter rests directly against the outer boundary surface of the solid electrolyte 3. The first ion-conducting layer 11 is followed by an electron-conducting layer 12, which completely encloses the ion-conducting layer 11. A second ion-conducting layer 11 follows without interspace. It likewise surrounds the first electron-conducting layer 12 in the manner of an envelope. The second electron-conducting layer 12 is arranged between this second ion-conducting layer 11 and the inner housing wall of the cup-shaped body 2. The second layer 12 likewise adjoins the housing wall 2 without intermediate space and the second ion-conducting layer 11. The second electron-conducting layer 12 covers the entire inside surface of the metallic housing 2. The two ion-conducting layers 11 can be made of a beta aluminum oxide mat in the embodiment example according to FIG. 2. Carbon or graphite felts can be considered as electron-conducting layers 12.

Instead of the beta aluminum oxide mats, mats of nasicon or sodium-yttrium silicate can be used for forming the two ion-conducting layers.

It is also possible, of course, in this connection as in the embodiment example according to FIG. 1, to use as ion-conducting material, layers of sodium-intercalated chalcogenides of metals from the group IVb, Vb and VIb of the periodic system. The ion-conducting layers 11 can then be made, for instance, of mats which are made of these materials.

If metals of the above-mentioned groups are used, the first ion-conducting layer 11 which adjoins the solid electrolyte 3, may be formed by application of a coating on the outer surfaces of the solid electrolyte 3. The second ion-conducting layer 11 can be applied as a coating to one of the two graphite felts 12 unless it has a mat-like structure.

The sulfur necessary for the chemical processes is located in the vicinity of the two electron-conducting layers 12 of graphite felt. In particular, these two layers 12 are impregnated with liquid sulfur before they are embedded in the cathode space 7.

The two electron-conducting layers 12 can also be formed by a carbon-foam matrix. Similarly, expanded graphite can be used for this purpose, as already described in the example shown in FIG. 1. In particular, two hollow cylinders are pressed from a mixture consisting of expanded graphite and liquid sulfur. An ion-conducting layer 11 can then be applied to the inside surfaces of these two hollow cylinders. The above-mentioned materials can again be considered for this purpose.

If, on the other hand, ion-conducting layers 11 of a mat-like material are used, then one of these layers is arranged between the solid electrolyte 3 and the first hollow cylinder 12, and the second layer 11 between the first and the second hollow cylinder 12 is chosen so that the cathode space is completely filled by the same.

Figure 3:
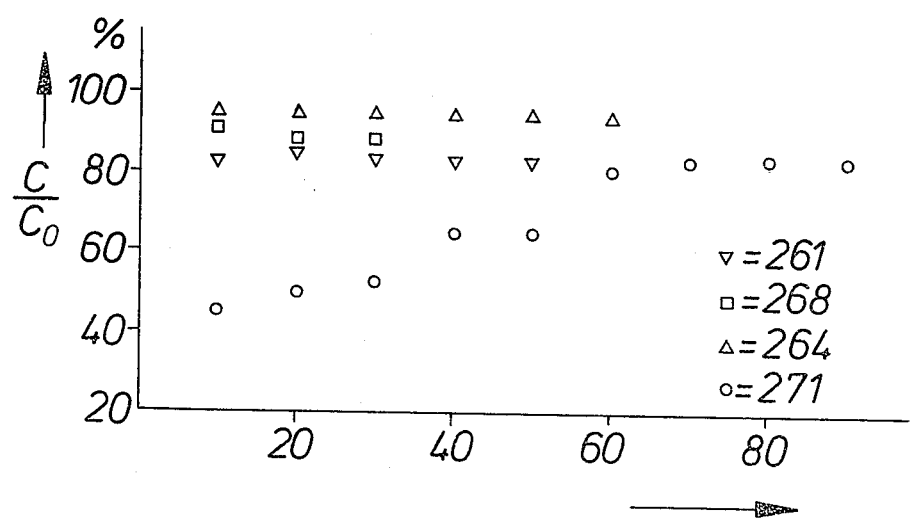
FIG. 3 shows a diagram in which the capacities of four storage cells are plotted as a function of the number of cycles.

FIG. 3 shows a diagram, in which the capacities of four storage cells, 261, 264, 268 and 271 are plotted as a function of the number of cycles. The measures curves of the four storage cells 261, 264, 268 and 271 are indicated by different markings. The association of the markings with the individual cells can be seen from FIG. 3.

The design of the four storage cells corresponds to the embodiment examples described before. The cathode space of the storage cell 261 is filled with a beta aluminum oxide mat 0.1 mm thick and a graphite felt, which is pressed, together with sulfur, into a tube closed on one side. This tube is inserted into the cathode space and fills it completely (not shown here). Before the pressing, the beta aluminum oxide mat and the graphite felt are arranged so that the beta aluminum oxide mat surrounds the solid electrolyte completely when the finished pressed body is inserted into the cathode space, and the graphite felt completely covers the inside boundary surface of the metal housing. The thickness of the pressed body is made so that the beta aluminum oxide mat as well as the graphite felt rest firmly against the boundary surfaces of the cathode space.

A beta aluminum oxide mat 0.1 mm thick is arranged around the solid electrolyte in the storage cell 271. It is followed by the graphite felt which is impregnated with sulfur. In the case of the storage cell 271, the ion-conducting and the electron-conducting layer are not pressed together. As can be seen in the diagram shown in FIG. 3, the gradual transition from electron-conduction to ion-conduction, which is essential for this invention, evidently takes place in this cell only after a forming phase of about 60 cycles.

The two storage cells 264 and 268 each contain two ion-conducting and two electron-conducting layers which are arranged alternatingly. The cathode space of these two storage cells is again filled with a pressed body which has the appearance of a tube closed on one side (not shown here). To make the pressed body, a graphite felt 8 mm thick is pressed together with a beta aluminum oxide mat 0.1 mm thick, which is followed by a graphite felt 1 mm thick and a further beta aluminum oxide mat. The order of the layers in the pressed body is chosen so that the graphite felt 8 mm thick covers the inside surface of the metal housing and rests firmly against the latter. The graphite felt is followed, as already described, by a beta aluminum oxide mat, a further graphite felt and a second beta aluminum oxide mat. The second beta aluminum oxide mat surrounds the solid electrolyte in the manner of an envelope and, likewise, rests firmly against the latter. The charging current of the cells 261, 264, 268 and 271 described above is 9 amps for each. This corresponds approximately to charging the storage cells within 5 hours.

Figure 4:
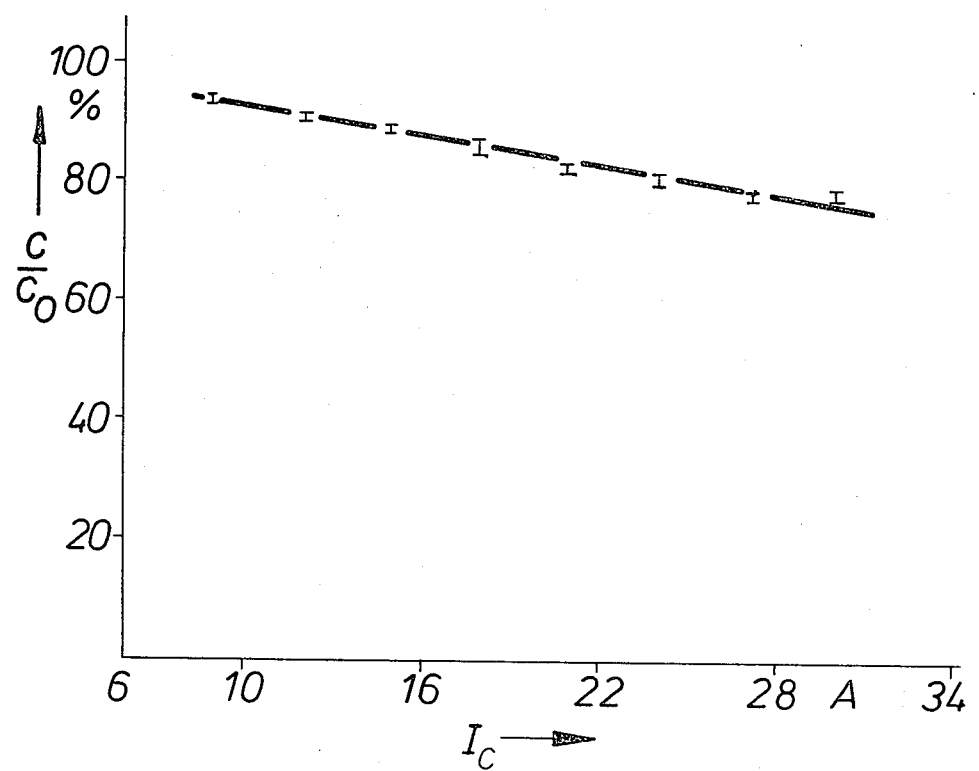
FIG. 4 shows a diagram in which the capacity of a storage cell is plotted as a function of the charging current.

In FIG. 4, the capacity of the storage cell 268 is plotted as a function of the charging current. As already mentioned above, the cathode space of this storage cell is filled by a pressed body which is formed by two ion-conducting and two electron-conducting layers which are arranged alternatingly. As can be seen from FIG. 4, only a slight drop of the capacity occurs with increasing charging current. The storage cell 268 can be charged up to 75% for several successive charging cycles in only 1.5 hours.

We claim:

1. Electrochemical storage cell based on alkali metal and chalcogen with at least one anode space for the alkali metal anolyte and a cathode space for the chalcogen catholyte of sulfur or sulfides and mixtures thereof, with the anode space and the cathode space separated from each other by an alkali-ion conducting solid electrolyte, and at least in some regions are enclosed by a metallic housing, the combination therewith of the outer surface of the solid electrolyte surrounded by a directly adjacent ion-conducting layer, and the inner surface of the metallic housing covered by a directly contacting electron-conducting layer, and wherein the electron-conducting layer borders the ion-conducting layer and conversely, and wherein at least the electron conducting layer is impregnated with sulfur, and wherein the cathode space is filled with the ion-conducting and the electron-conducting layers.

2. Storage cell according to claim 1, wherein the ion-conducting layer is a beta aluminum oxide mat.

3. Storage cell according to claim 1, wherein the ion-conducting layer consists of nasicon.

4. Storage cell according to claim 1, wherein the ion-conducting layer consists of sodium-yttrium silicate.

5. Storage cell according to claim 1, wherein the ion-conducting layer consists of sodium-intercalated chalcogenides of metals of the group IVb, Vb and VIb of the periodic system.

6. Storage cell according to claim 1, wherein the electron-conducting layer is formed by a carbon or graphite felt.

7. Storage cell according to claim 1, wherein the electron-conducting layer is formed by a carbon foam matrix.

8. Storage cell according to claim 1, wherein the electron-conducting layer is formed by expanded graphite.

9. Storage cell according to claim 1 or 2 or 3 or 4 or 5, wherein the ion-conducting layer is permeated at least in some regions by fibers of the electron-conducting layer.

10. Electrochemical storage cell based on alkali and chalcogen with at least one anode space for the alkali metal anolyte and a cathode space for the chalcogen catholyte of sulfur or sulfides and mixtures thereof, with the anode space and the cathode space separated from each other by an alkali-ion conducting solid electrolyte, and at least in some regions are enclosed in a metallic housing, the combination therewith of an ion-conducting beta aluminum oxide mat lying directly at the outer surface of the solid electrolyte surrounding it completely, a carbon or graphite felt covering the inner surface of the metallic housing, and with said felt directly adjacent at its borders to said beta aluminum oxide mat, and wherein at least the carbon or graphite felt is impregnated with sulfur, and wherein the cathode space is filled by the ion-conducting beta aluminum oxide mat and the carbon or graphite felt.

11. Electrochemical storage cell based on alkali metal and chalcogen with at least one anode space for the alkali metal anolyte and a cathode space for the chalcogen catholyte of sulfur or sulfides and mixtures thereof, with the anode space and the cathode space separated from each other by an alkali-ion conducting solid electrolyte and at least in some regions are enclosed in a metallic housing, the combination therewith of the outer surface of the solid electrolyte surrounded by a directly adjacent ion-conducting nasicon-ceramic, a carbon foam matrix covering the inner surface of the metallic housing, and with said carbon foam matrix directly adjacent at its borders to said nasicon-ceramic, and wherein at least the carbon foam matrix is impregnated with sulfur, and wherein the cathode space is filled by the nasicon-ceramic and the carbon foam matrix.

12. Electrochemical storage cell based on alkali metal and chalcogen with at least one anode space for the alkali metal anolyte and a cathode space for the chalcogen catholyte of sulfur and sulfides and mixtures thereof, with the andoe space and the cathode space separated from each other by an alkali-ion conducting solid electrolyte, and at least in some regions are enclosed in a metallic housing, the combination therewith of the outer surface of the solid electrolyte surrounded by a directly adjacent ion-conducting sodium-yttrium-silicate, expanded graphite covering the inner surface of the metallic housing, and with said expanded graphite directly adjacent at its borders to said sodium-yttrium-silicate, and wherein at least the expanded graphite is impregnated with sulfur, and wherein the cathode space is filled by the sodium-yttrium-silicate and the expanded graphite.

13. Electrochemical storage cell based on alkali metal and chalcogen with at least one anode space for the alkali metal anolyte and a cathode space for the chalcogen catholyte of sulfur and sulfides and mixtures therefor, with the anode space and the cathode space separated from each other by an alkali-ion conducting solid electrolyte, and at least in some regions are enclosed in a metallic housing, the combination thereof in which the cathode space is filled with a plurality of porous ion-conducting layers and a plurality of electron conducting layers, which are alternatingly arranged between the solid electrolyte and the metallic housing, and wherein one first ion-conducting layer lies adjacent to the solid electrolyte, and one electron conducting layer borders at the inner surface of the metallic housing, and wherein at least the electron-conducting layers are impregnated with sulfur.

* * * * *